INVENTOR
PHILLIP W. WARD

*E. Mickey Hubbard*
ATTORNEY

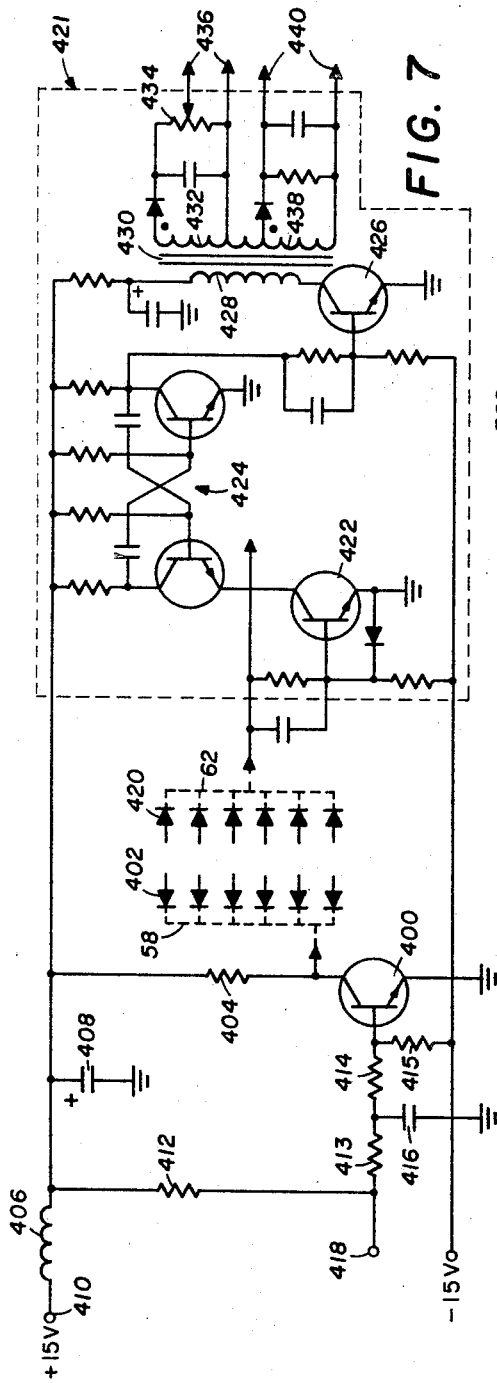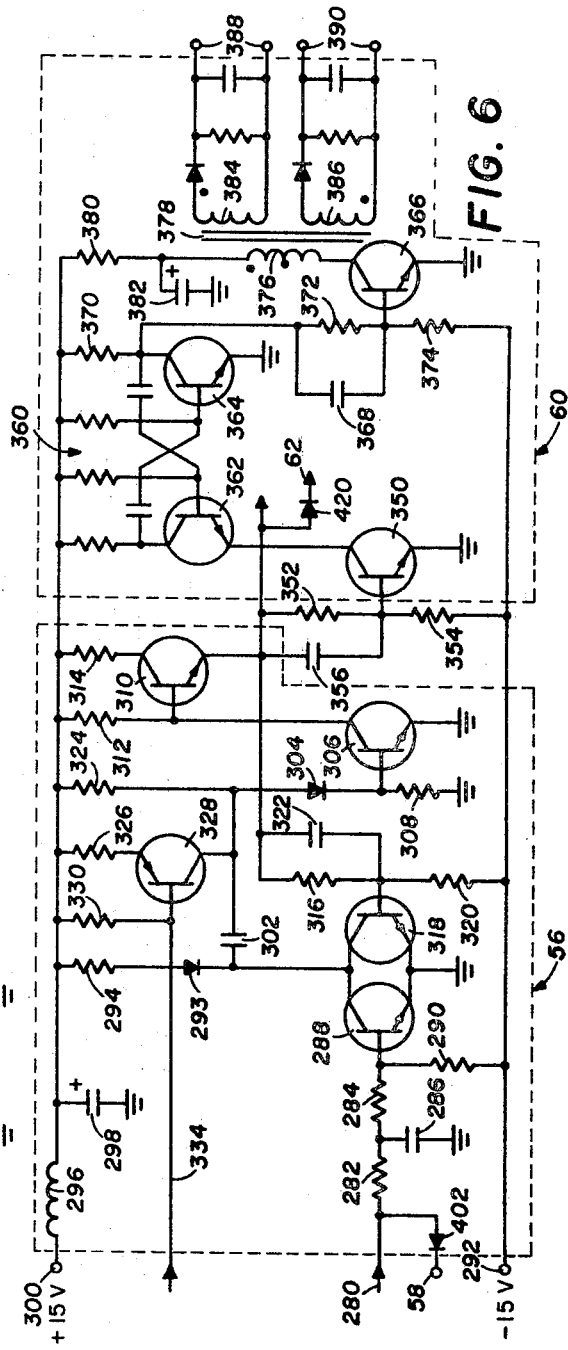

United States Patent Office 3,398,395
Patented Aug. 20, 1968

3,398,395
SEISMIC AMPLIFIER SYSTEM WITH PREPROGRAMMED GAIN CONTROL
Phillip W. Ward, Dallas, Tex., assignor to Texas Instruments Incorporated, Dallas, Tex., a corporation of Delaware
Filed Apr. 28, 1966, Ser. No. 545,985
2 Claims. (Cl. 340—15.5)

ABSTRACT OF THE DISCLOSURE

A seismic sensor of waterborne energy including a passive band-pass filter designed to pass only energy in a frequency range characteristic of the energy to be detected to an amplifier having a relatively slow acting automatic gain control which initially amplifies the energy, then decreases in gain by means of a feedback circuit so as to essentially terminate the output of the amplifier system after a short period of time. A rectifier at the output of the amplifier produces an analog output having an initial sharp transition and an exponential decay. The output of the amplifier system is also applied to a pulse-forming circuit which initiates a pulse when the rectified output of the amplifier system exceeds a selected threshold.

---

This invention relates generally to the seismographic art, and more particularly relates to an improved water break amplifier for detecting the first arrival of waterborne some energy.

In the conduct of marine seismic exploration for oil, gas and other minerals, an instrument boat customarily pulls a streamer of twenty-four groups of equally spaced seismic sensors through the water. Explosive charges are usually placed and sequentially detonated in the water by a separate shot boat, although in some instances the charges are placed and detonated from the instrument boat. The positions of both the instrument boat and the shot boat are precisely known with respect to a reference point on shore. However, the positions of the individual sensor groups in the streamer are not known because currents and other factors may prevent the streamer from trailing in a straight line directly behind the boat. Since the streamers are rather long, undesirable error can be introduced by assuming the location of the sensor groups. However, the position of the various groups of sensors can be determined by measuring the travel time of sonic energy from the shot through the water directly to the respective sensor groups. The principal difficulty with this approach lies in the fact that the direct or waterborne sonic energy from the seismic shot is not always the first energy to arrive at the sensors. For example, sonar transmitters in the area may produce anomalous energy in the frequency range of 10 kc. and above. Also, it is possible for seismic energy in the frequency range up to about 500 cycles to outrun the direct waterborne energy because the seismic energy may propagate at a higher velocity along a shallow discontinuity in the ocean floor. Another serious problem in detecting the true water break is that anomalous noise levels and sonic energies vary considerably from one locale to another, so that it is extremely difficult to discriminate the true waterborne energy using any predetermined frequency criteria.

The most useful type of system used in the field to record seismic data records the data as a series of digital data. Water break detection systems heretofore employed to produce a digital pulse compatible with the digital field systems have proven so unreliable as to be often disregarded when the marine seismic data is processed.

A principal object of this invention is to provide an improved system for detecting the first arrival of direct waterborne sonic energy.

Another object is to provide such a system which is compatible with digital as well as analog field recording systems.

Another object of the invention is to provide such a system which produces an analog envelope from which the true water break energy can be determined.

A further object is to provide such a system wherein the adverse effects of spurious noise spikes of the same character as the water break energy and of sufficient amplitude to produce a digital output pulse are reduced to a minimum.

Still another object is to provide a system which can be adjusted to operate in a wide variety of environmental noise conditions without false triggering.

A further object is to provide an amplifier system having a gain that is voltage variable over a wide range.

A system constructed in accordance with the present invention features a passive band-pass input filter which essentially passes only energy in a frequency range characteristic of the energy to be detected, which in the case of explosive generated sonic energy is from about 1000 c.p.s. to about 5000 c.p.s. This energy is applied to an amplifier system having a relatively slow acting automatic gain control which initially amplifies the energy, then decreases in gain due to feedback so as to essentially terminate the output of the amplifier system after a short period of time. The A.C. output of the amplifier is then rectified to produce an analog output having an initial sharp transition and an exponential decay as a result of the decreased gain which is easily recognizable as the true water break. The output from the amplifier system is also applied to a pulse forming circuit which initiates a pulse when the rectified output of the amplifier system exceeds a selected threshold. The pulse normally lasts for a period longer than the time required for the gain of the amplifier to be decreased so that the output is less than the threshold level to prevent secondary triggering. However, provision is also made to abort the pulse in the event the signal output from the amplifier ceases before the normal period of the pulse, as would be the case for a noise spike which exceeded the threshold, and thus produce a pulse that is often so short in duration as to not be recorded by the digital recording system. The maximum gain of the amplifier system, the recovery time of the feedback control, and the threshold level of the pulse circuit are all adjustable to facilitate operation of the system under various ambient noise conditions.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIGURE 6 is a schematic circuit diagram of still another portion of the water break detector illustrated in FIGURE 2;

FIGURE 7 is a schematic circuit diagram of a portion of a six channel water break detector system constructed in accordance with this invention;

Figure 1:
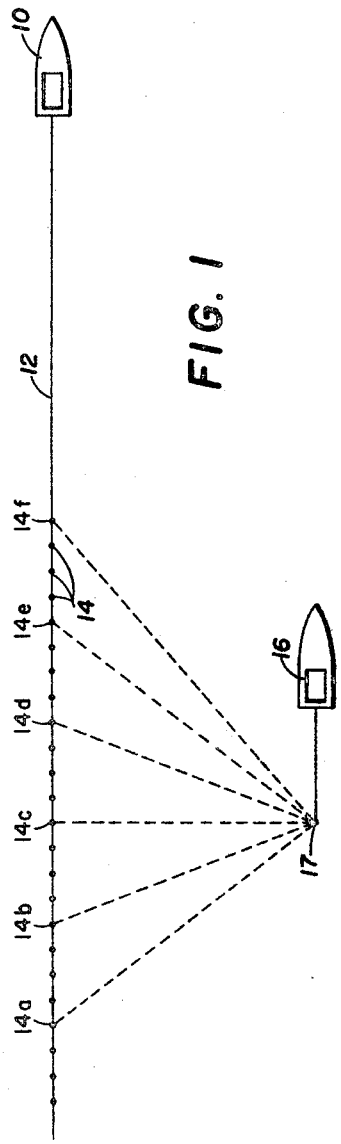
FIGURE 1 is a schematic diagram illustrating a typical marine seismic exploration system.
Figure 4:
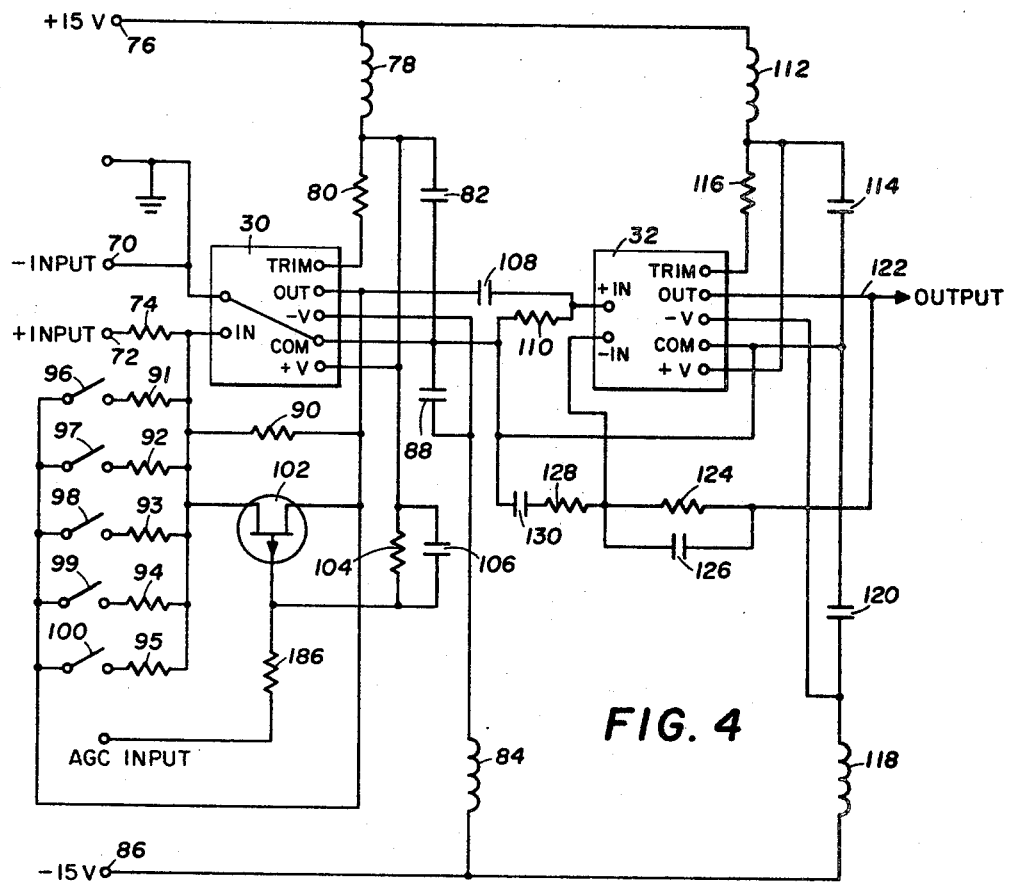
FIGURE 4 is a schematic circuit diagram of a portion of the water break detector illustrated in FIGURE 2.

Referring now to the drawings, and in particular to FIGURE 1, an instrument boat 10 customarily pulls a long streamer 12 having typically twenty-four equally spaced seismic sensor groups 14. Explosive charges are customarily detonated from a shot boat 16 traveling in the same direction as the instrument boat 10 and positioned at any number of positions relative to the streamer 12, the position abreast of the streamer as illustrated being merely exemplary. The positions of the instrument boat 10 and the shot boat 16 with respect to a reference point on land are known at all times with considerable accuracy. The positions of the sensors 14 with respect to the shot point 17, however, are not known because the streamer 12 does not always trail in a straight line behind the instrument boat 10 due to turns made by the boat, currents, etc. Since the streamer 12 is very long, significant errors may occur in subsequent seismic data unless the position of the sensors is known during the brief period the seismic energy is transmitted and received. Since sonic energy travels at a known uniform velocity through water, the positions of the sensors with respect to the seismic shot can be determined by measuring the direct transit time of the sonic energy through the water from the shot point to the respective sensors.

The first arrival of the waterborne sonic energy, and more specifically the abrupt increase of the analog signal customarily attributable to the waterborne energy, is known in the art as the water break. The embodiment of this invention which will presently be described is particularly adapted to detect the water break and to produce both an analog envelope and a digital pulse clearly and accurately representing the first arrival of waterborne energy under a wide variety of ambient noise conditions.

Figure 2:
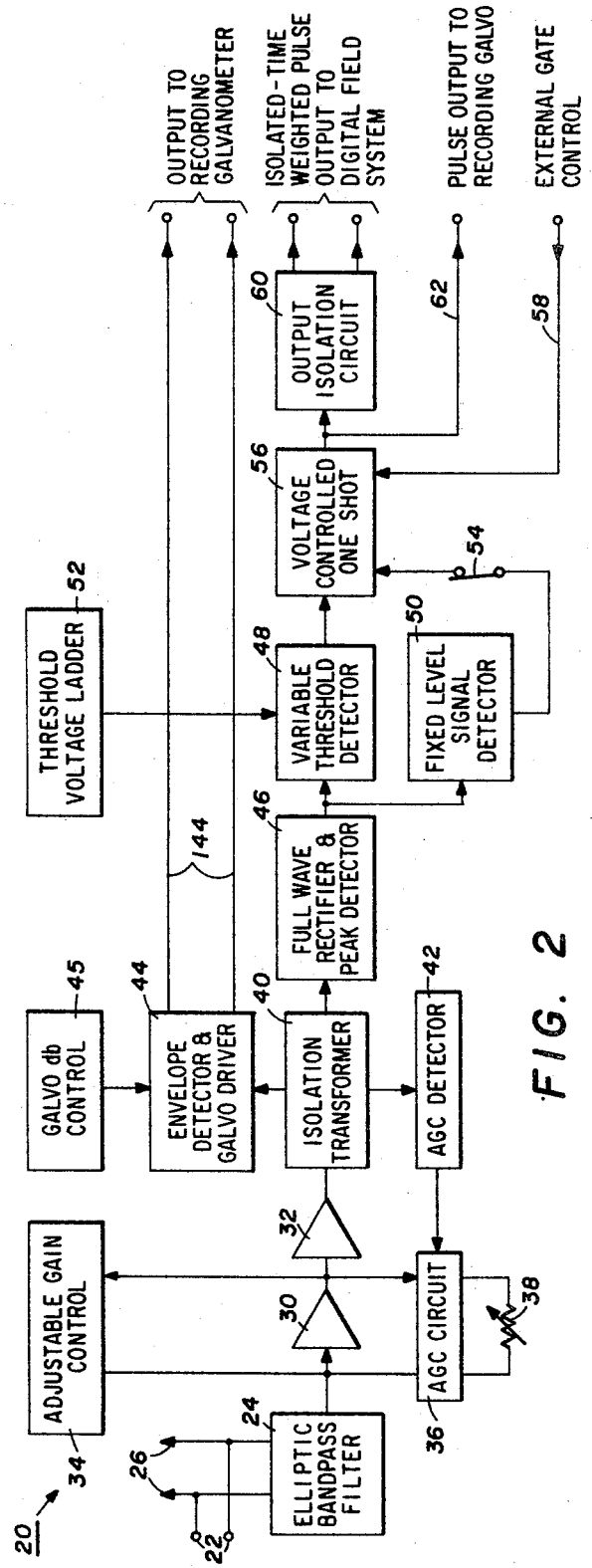
FIGURE 2 is a simplified circuit diagram of one channel of a water break detector constructed in accordance with the present invention.

Referring now to FIGURE 2, one channel of a six channel water break amplifier system constructed in accordance with the present invention is indicated generally by the reference numeral 20. The other five channels are identical and each of the six channels is connected to the output of one of six equally spaced sensor groups on the streamer 12, such as sensor groups 14a–14f. The output lines 22 from the sensor group 14a, for example, are isolated from ground and are applied to the input of an elliptic band-pass filter 24. The output of the group of sensors is also applied by leads 26 to the system being used to record the seismic data from that group of sensors. The recording system will usually be a digital recording system, although an analog recording system may also be used with the water break detector system of this invention.

The output from the band-pass filter 24 is applied to the input of a first operational amplifier 30, and the output of amplifier 30 is applied to the input of a second operational amplifier 32. The gain of amlifier 30 may be manually adjusted in fixed increments by a gain control circuit 34 which is a digitalized potentiometer, and is also automatically controlled by an automatic gain control circuit 36. The recovery period of the AGC circuit 36 may be selected by a manually variable resistor 38. The output of amplifier 32 is applied to an isolation transformer 40 which drives an AGC detector 42. The AGC detector 42 \n turn drives the AGC circuit 36 so that the gain of amplifier 30 is controlled by the output of the fixed gain amplifier 32, rather than the output of amplifier 30.

The isolation transformer 40 also drives an envelope detector and galvo driver circuit 44 to provide a rectified and partially integrated analog response which may be used to drive a suitable recording galvanometer. The amplitude of the analog signal may be adjusted by a galvo db control circuit 45. The isolation transformer 40 also drives a full wave rectifier and peak detector circuit 46. The peak voltage detected by the circuit 46 is compared with a selected threshold value by both a variable threshold detector 48 and fixed level signal detector 50. The threshold level of threshold detector 48 is determined by the selected setting of a threshold voltage ladder 52. When the peak voltage from the peak detector 46 exceeds the threshold voltage, detector 48 produces an output which triggers a voltage controlled one shot circuit 56. The fixed level signal detector also produces an output signal when the peak voltage from detector 46 reaches a selected minimum and this signal enables the one shot 56. Thus, the voltage controlled one shot circuit 56 is initiated by the output of the variable threshold detector 48, but the duration of the output pulse from the one shot can endure only so long as the signal from detector 50 persists. The voltage controlled one shot 56 may be disabled by an external gate control 58. The output from the voltage controlled one shot is fed through an output isolation circuit 60 which drives the digital field recording system where the pulse is recorded along with subsequent seismic data. The pulse output from the voltage controlled one shot 56 is also fed through an output 62 to the recording galvo where it is recorded for comparison with the analog envelope produced by the envelope detector and galvo driver circuit 44.

The true direct arrival of the sonic energy from an explosive detonation is a complex of frequencies from the exceedingly low subsonic spectrum to the exceedingly high audio range. The energy density of these components changes rapidly with distance from the source as they are propagated, reflected and refracted in the medium. The major portion of the energy in the direct waterborne sonic wave, however, lies in a frequency spectrum which is typically centered near 2000 cycles per second for a dynamite source. The array of each group of sensors on the streamer 12 is somewhat frequency selective above about 250 c.p.s. because of the longitudinal spacing along the streamer 12 of the sensors of the group which are connected in parallel to provide increased signal amplitude. Thus, depending upon the spacing between these sensors and the angle of the wave propagation to the streamer 12, the signal from one sensor tends to cancel the signal from another sensor of that group for certain frequencies. However, this cancellation occurs only for a steady state situation because there is a finite time difference between the arrival times of the energy at each sensor of a given group. This transient response of the transducer array is sufficiently high to produce a recognizable water break.

Figure 3:
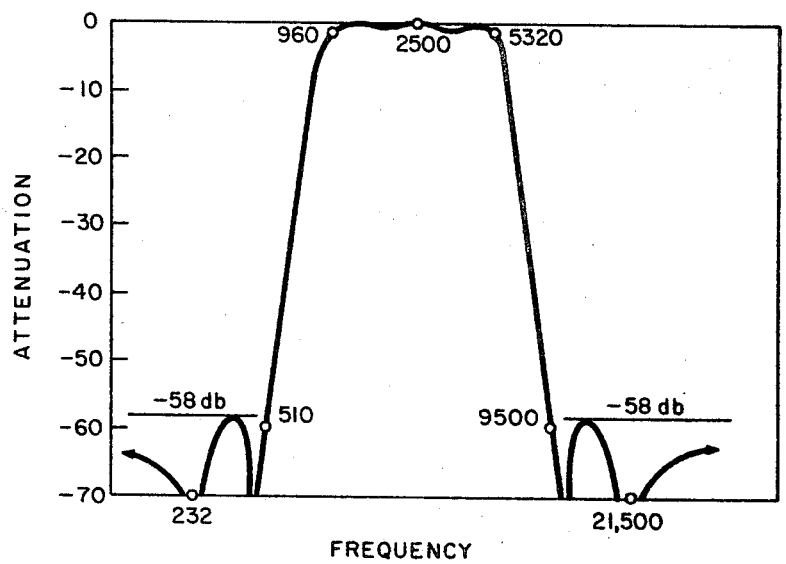
FIGURE 3 is a plot of the frequency response of a bandpass filter used in the circuit illustrated in FIGURE 2 when dynamite is used as the energy source.

The input filter 24 is an elliptic band-pass filter, often called a general Tschebyscheff filter, having a frequency response as illustrated in FIGURE 3 for a dynamite source. It will be noted that the pass band is centered at 2500 c.p.s. with 1-db corner points at 960 c.p.s. and 5320 c.p.s. The filter has 60-db attenuation at 510 c.p.s. and 9500 c.p.s., thus having an effective attenuation rate of approximately 90-db per octave just outside the pass band. This type of filter is characterized by an equal ripple response in both the pass band and the stop band and represents the maximum possible filter rejection capability for a given number of inductor and capacitor elements. The pass band ripple for this filter is slightly greater than 0.5 db. In the stop band, instead of the attenuation decreasing monotonically versus frequency change the attenuation ripples from a minimum attenuation point of −58 db to a theoretically infinite rejection, and then the response ultimately becomes asymptotic with the −58 db level. The particular filter described is particularly suited for detecting water break energy when a dynamite source is used. In the event other types of sources, such as gas or air guns, sparkers, etc., are used, the pass band of the filter may be shifted to center on the characteristic frequency spectrum of the particular source.

The filter 24 is a conventional elliptic band-pass filter except that input and output isolation transformers are used in the filter and the components of the filter, including the transformers are electrostatically and magnetically shielded.

From the frequency response curve in FIGURE 3, it will be noted that the filter input impedance is very high in the stop band, and is nominal in the pass band. The characteristic input and output impedance used in the particular embodiment herein described is 5000 ohms in the pass band, and in excess of 100,000 ohms in the stop band. The elliptic band-pass filter is passive in that it employs no active components and has a minimum input signal amplitude on the order of microvolts and a maximum input amplitude on the order of volts. Due to the high input impedance of the filter 24 in the stop band, which includes the seismic frequency range below about 250 c.p.s., the seismic sensors are not loaded in the seismic frequency range, yet the filter provides a reasonable power transfer in the band between 1000 c.p.s. and 5000 c.p.s. that is characteristic of the water break energy.

Referring now to the more detailed circuit diagrams of FIGURES 4–7, one input terminal 70 is connected to the common input of amplifier 30 and is grounded. The other input terminal 72 is connected through resistor 74 to the positive input of amplifier 30 which is a conventional operational amplifier. A positive voltage supply terminal 76 is connected through choke 78 to the positive voltage supply terminal +V of amplifier 30, and through resistor 80 to the trim terminal. The choke 78 in combination with capacitor 82 decouples the amplifier from the positive voltage supply. A negative voltage supply terminal 86 is connected to the negative voltage supply terminal −V of amplifier 30 by choke 84, and capacitor 88 combined with the choke 84 serves to decouple the amplifier from the negative voltage supply.

The output of the amplifier 30 is connected back to the input by a fixed resistor 90, and is selectively connectable back to the input through resistors 91–95 by closing switches 96–100, respectively. Thus, when all of the switches 96–100 are open, the gain of the amplifier 30 is at the maximum selectable value. By selectively closing switches 96–100, the gain of the amplifier 30 may be progressively decreased because the values of resistors 91–95 progressively decrease. In accordance with an important aspect of the invention, a field effect transistor 102 also interconnects the output and the input of amplifier 30 and thus is connected in parallel with each of the resistors 91–95. The gate of transistor 102 is normally reverse biased through resistor 104, which interconnects the positive voltage supply and the gate of the field effect transistor 102 so that the transistor has a maximum impedance. A capacitor 106 provides a low impedance transient path in the AGC circuit.

The output of amplifier 30 is A.C. coupled through capacitor 108 to the input of amplifier 32. The voltage signal is impressed across resistor 110 which interconnects the input terminal of amplifier 32 and the common output of amplifier 30. The positive voltage terminal +V of amplifier 32 is connected through choke 112 to the positive voltage terminal 76. The choke 112 in combination with capacitor 114 decouples amplifier 32 from the voltage supply. A trim resistor 116 connects the positive voltage supply to the trim terminal of amplifier 32. The negative voltage supply terminal −V of amplifier 32 is connected by choke 118 to the negative voltage supply terminal 86, and the choke 118 in combination with capacitor 120 decouples the power supply from the amplifier 32. The output 122 of amplifier 32 is D.C. and A.C. coupled to the negative input of the amplifier 32 by resistor 124 and capacitor 126, respectively. The negative input is also connected through resistor 128 and capacitor 130 to ground. Thus, the amplifier 32 is operated in a standard noninverting A.C. amplifier mode and has a constant or fixed gain determined by the ratio of resistors 124 and 128. The value of capacitor 130 determines the low frequency cutoff, and the value of capacitor 126 determines the high frequency cutoff of the amplifier 32. These frequencies are typically chosen at around 500 and around 10,000 cycles per second in order to assure a flat frequency response in the pass band of the input filter 24.

The output 122 of amplifier 32 is connected to the primary winding 132 of the isolation transformer 40. One secondary winding 134 of the transformer 40 has the same number of turns as the primary winding 132 and is connected to the envelope detector and galvo driver circuit 44. The circuit 44 is essentially comprised of a full wave diode bridge rectifier comprised of diodes 135–138 and an integrating capacitor 140. The voltage from the bridge is impressed across a resistor 142 and the galvo db control resistor 45. Outputs 144 then apply the voltage across the resistors to the recording galvanometer heretofore mentioned in connection with the description of FIGURE 2.

Another secondary winding of the transformer 40 is divided into halves 160 and 162. The secondary winding 160 is used to drive the AGC detector 42, and has about 2.25 times as many turns as the primary winding 132. One terminal of the secondary winding 160 is connected to the base of transistor 166 which is connected in Darlington pair configuration with transistor 168. The other terminal of winding 160 is connected through conductors 170 and 172 to the emitter of transistor 168. Diode 174 clamps the reverse base-emitter voltage excursions of the transistors during the negative portions of the cycles. Resistor 176 provides a D.C. path for $I_{CBO}$ leakage at the base of transistor 168. A capacitor 178 is charged primarily through fixed resistor 180, and variable resistor 38, and is discharged through resistor 182 and transistor 168. The charge on capacitor 178 is applied through conductor 184 to the AGC input in FIGURE 4, and thence through resistor 186 to the base of the field effect transistor 102. Thus, it will be noted that in the absence of a signal to the primary winding 132, the base of transistor 166 will be at essentially the same potential as the emitter of transistor 168, and the Darlington pair will be turned off. Capacitor 178 will then be charged through resistors 180 and 38, as well as through resistors 104 and 186 in FIGURE 4, and the gate of field effect transistor 102 will be reverse biased with approximately +15 volts so that the impedance of transistor 102 will be very high. Then when a signal is applied to the primary winding 132, transistors 166 and 168 will be turned on and capacitor 178 discharged to reduce the voltage applied to the gate of field effect transistor 102. This reduces the impedance of transistor 102 and thus decreases the gain of amplifier 30. The rate at which the AGC takes effect is determined by the values of resistor 182 and capacitor 178. The value of resistors 180, 186 and 104 and the setting of variable resistor 38 determines the rate at which capacitor 178 can be recharged when transistor 168 is again turned off, and thus the recovery period for the AGC circuit.

Amplifier 30 is operated as a variable gain operational amplifier. The maximum gain is determined by manually operating switches 96–100 so as to swith the negative feedback resistors 91–95 into the feedback loop. Amplifier 30 is compensated so as to be unconditionally stable for any resistive feedback condition. Amplifier 30 is also operated as an inverting amplifier, i.e., the signal is fed to the inverting input. The gain of amplifier 30 is essentially the effective feedback resistance divided by the total source resistance. Thus, if the feedback resistance is greater than the source resistance, the amplifier has a positive gain; if the feedback resistance is equal to the source resistance, there is unity gain; and if the feedback resistance is less than the source resistance, the amplifier acts as an attenuator. As a result of the field effect transistor 102, amplifier 30 has a gain range of from +45-db gain to nearly 35-db insertion loss, for a total range of 80 db. However, such range is possible only by optimizing the effective source impedance, minimizing the noise output of the input amplifier, and operating the field effect transistor 102 within an extremely small drain to source voltage range. The last requirement is accomplished and a maximum overall gain of about 90 db is achieved by operating the second stage amplifier 32 at about +45-db gain.

The second stage amplifier 32 is operated as a noninverting amplifier. In this configuration, the gain is independent of the source impedance, so that even if the feedback resistor goes to zero, there is still unity gain. While operating in this configuration, a high input impedance is achieved, the input impedance being determined essentially by resistor 110, which is selected equal to feedback resistor 124 for optimum leakage balance. The coupling capacitor 108 may then be small. Both amplifiers 30 and 32 have units D.C. gain which improves the output D.C. stability with temeprature.

In the first amplifier 30, the low frequency corner point is determined by the filter characteristics, and this occurs at about 1 kc. At 72-db gain or less, the high frequency corner is also determined by the filter since it occurs first at 5 kc. However, this does not reduce any high frequency noise generated in amplifier 30, and certainly not in amplifier 32. Thus, both amplifiers are cornered at about 10 kc. to improve noise performance. The second amplifier 32 also has a low frequency 3-db corner point at about 500 c.p.s. determined when the capacitive reactance of capacitor 130 equals resistor 124. At overall gains higher than 72 db, the internal compensation of the amplifiers causes the gain to corner just above 1.2 kc. Thus, it will be noted that the two amplifiers are basically D.C. amplifiers in hybrid operation as A.C. amplifiers, with an essentially flat response between 500 c.p.s. and 10,000 c.p.s. The operation at unity D.C. gain with large negative feedback makes them rigidly stable and exceptionally quick to recover from overload. Although they are operated single endedly at both inputs, they are differentially balanced and D.C. coupled internally and thus exhibit high common mode rejection qualities. The primary difference between the amplifiers 30 and 32 is that amplifier 30 is a very low noise amplifier with ±2 milliamp maximum load current capability, while amplifier 32 is a low noise amplifier with ±20 milliamp maximum load current capability. In the particular embodiment of the invention herein described in detail, amplifier 30 is a Philbrick model PP65AU amplifier, and amplifier 32 is a Philbrick model PP45ALU.

Figure 5:
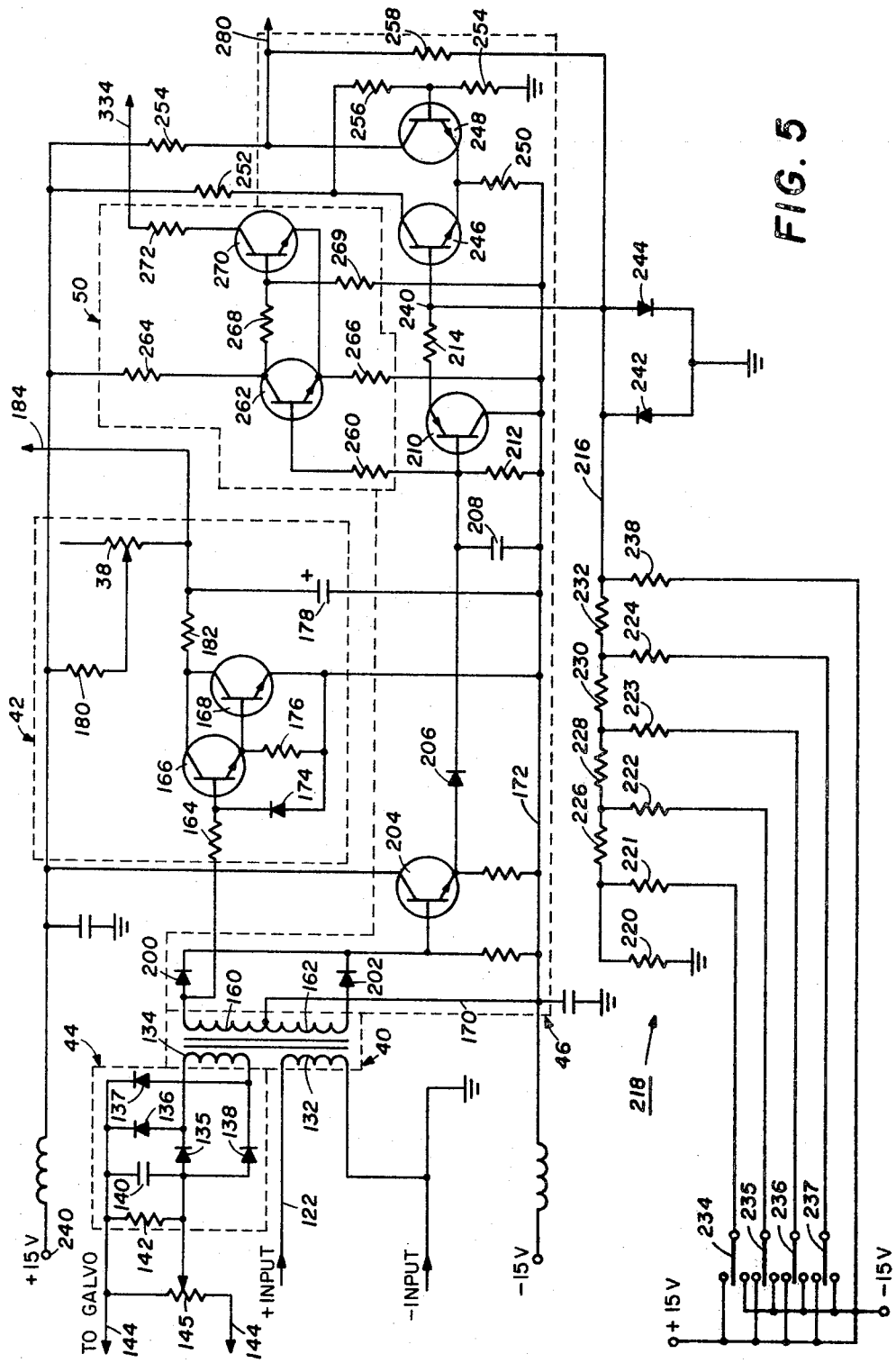
FIGURE 5 is a schematic circuit diagram of another portion of the water break detector illustrated in FIGURE 2.

The rectifier of circuit 46, which is represented by the dotted outline in FIGURE 5, is comprised of diodes 200 and 202 which, together with the center tapped secondary winding 160–162, form a full wave rectifier. The rectifier drives an emitter-follower transistor 204 which drives a peak detector comprised of diode 206 and capacitor 208. The peak voltage stored on the capacitor 208 is applied to the base of transistor 210, which is the input of the variable threshold detector 48. Resistor 212 provides a discharge path for the capacitor 208 and biases the base of transistor 210. The collector of transistor 210 is connected to the negative voltage supply terminal, and the emitter is connected through resistor 214 to the output 216 of a digital voltage supply ladder indicated generally by the reference numeral 218 and comprised of resistors 220–224 and resistors 226–232. Resistors 226–232 are equal to resistor 214, and resistors 220–224 are twice as large as resistors 214 and 226–232. Resistors 221–224 may be selectively connected either to the +15 v. supply or to —15 v. supply by manually operated switches 234–237. Resistor 238 is permanently connected to the +15 volt supply terminal. Regardless of which combination of the switches 234–237 are closed, the resistance between control point 240 and the voltage supply is equal to resistor 214. By closing the switches 234–237 in various combinations, the voltage applied to the control point 240 through the equivalent resistance may be varied from +2 volts to +15 volts. Diodes 242 and 244 clamp control point 240 to ground and hold the voltage of point 240 between about +0.7 volt and —0.7 volt.

Control point 240 is the base of transistor 246, which is connected differentially with transistor 248. The emitters of transistors 246 and 248 are common and are connected through resistor 250 to the negative voltage supply terminal. The collectors of the transistors are connected through resistors 252 and 254, respectively, to the positive voltage supply terminal. The base of transistor 248 is connected through resistor 254 to ground for reference purposes, and resistor 256 interconnects the base of transistor 248 and the collector of transistor 246 to provide a regenerative switching path. Resistor 258 interconnects the collector of transistor 248 and the base of transistor 246 for the same purpose. Under no signal condition, the charge on capacitor 208 is zero, so that the base and emitter of transistor 210 are essentially at —15 v. Current then flows through diode 242 and control point 240 is at —0.7 volt. As the capacitor 208 is charged, the voltage at the emitter of transistor 210 increases until it is equal and opposite to the voltage applied through the ladder network 218. Then the base of transistor 246 becomes more positive than the base of transistor 248, thus turning transistor 246 on and transistor 248 off. Abrupt switching is promoted by the regenerative feedback paths formed by resistors 256 and 258. The output 280 then goes from ground potential to essentially +15 v.

The voltage on the capacitor 208 also triggers the fixed level signal detector 50 which is essentially a Schmitt trigger when it reaches a predetermined level. The voltage on capacitor 208 is applied through resistor 260 to the base of transistor 262. The collector of transistor 262 is connected through resistor 264 to the positive voltage supply terminal, and the emitter is connected through resistor 266 to the negative voltage supply terminal. Resistor 268 connects the collector of transistor 262 to the base of a second transistor 270. Resistor 269 connects the base of transistor 270 to the negative voltage supply terminal. The emitters of transistors 262 and 270 are common, and the collector of transistor 270 is connected by resistor 272 and another resistor presently to be described to the positive voltage supply terminal. When the charge on capacitor 208 is at a low value, transistor 262 is turned off, and transistor 270 is turned on as a result of the resistor biasing network. When the voltage level on capacitor 208 exceeds a predetermined level, a level chosen greater than the level produced after the AGC circuit 36 has reduced the output of amplifier 32 to a minimum value, transistor 262 is turned on and transistor 270 turned off, thereby raising the potential at output 334.

The output 280 of the full wave rectifier and peak detector 46 is applied to the input of the voltage controlled one shot 56 and thence through a noise integrator circuit comprised of resistors 282 and 284 and capacitor 286 to the base of a switching transistor 288. The base of transistor 288 is connected by resistor 290 to the negative voltage supply terminal 292, the emitter is connected to ground, and the collector is connected through diode 293, resistor 294, and the isolation filter comprised of choke 296 and capacitor 298 to the positive voltage supply terminal 300. The collector of transistor 288 is A.C. coupled by capacitor 302 and diode 304 to the base of transistor 306 and then to ground by resistor 308. The emitter of transistor 306 is connected directly to ground and the collector is connected through resistor 312 to the positive voltage supply terminal. The collector of transistor 306 drives the base of emitter-follower transistor 310, the collector of which is connected through resistor 314 to the positive voltage supply terminal. The emitter of transistor 310 is connected through resistor 316 to drive the base of transistor 318, and by resistor 320 to the negative voltage supply terminal. Transistor 318 is connected in parallel with input transistor 288 and form a holding circuit. A speedup capacitor 322 provides an A.C. bypass around resistor 316. Capacitor 302 may be charged from the positive voltage supply terminal 300, either through a first charging circuit comprised of resistor 324 or through a second charging circuit comprised of resistor 326 and transistor 328. The base of transistor 328 is connected by resistor 330 to the positive voltage supply terminal, and is connected to the output 334 of the fixed level signal detector 50.

Under no signal conditions, transistor 288 is off and transistor 328 is on so that both plates of capacitor 302 are essentially at +15v. Transistor 306 is therefore on and transistors 310 and 318 off. When the inputs 280 and 334 go positive, transitor 288 is turned on and transistor 328 turned off. Capacitor 302 is immediately discharged and the negative pulse coupled through to the base of transistor 306, turning transistor 306 off and transistors 310 and 318 on. This condition persists until capacitor 302 is charged through resistor 324, then transistor 306 is turned on and transistors 310 and 318 turned off. This normally requires about 30 milliseconds. However, if input 334 should go negative before that time, transistor 328 will turn on and capacitor 302 will be quickly charged in about one millisecond, thus turning transistor 306 on and transistor 310 off.

The emitter-follower transistor 310 also drives the output isolation circuit 60 by driving the base of control transistor 350 through resistors 352 and 354. Capacitor 356 A.C. couples the emitter of transistor 310 to the base of transistor 350 to provide faster operation. Transistor 350 controls a free running multivibrator circuit indicated generally by the reference numeral 360 that is comprised generally of transistors 362 and 364 and the associated biasing and regenerative feedback circuits. The multivibrator 360 is set in operation by turning transistor 350 on and switches at a frequency of about 10 kc. The collector of transistor 364 drives the base of transistor 366 through capacitor 368. The base of transistor 366 is biased by the resistor network comprised of resistors 370, 372 and 374 connected between the positive and negative voltage supply terminals 300 and 292. Transistor 366 switches the current through the primary winding 376 of an output microtransformer 378 on and off. Resistor 338 limits current through transistor 366, and in combination with capacitor 382 forms an isolation filter at the 10 kc. frequency. The signal induced in each of two secondary windings 384 and 386 is rectified and filtered to produce D.C. pulses at the output pairs 388 and 390, respectively, having a duration corresponding essentially to that of the pulse produced at the emitter of transistor 310.

All of the one shot circuits 56 of the six channels can be simultaneously disabled by the circuit illustrated in FIGURE 7. The collector of a transistor 400 is connected to the external gate control terminal 58 of the respective one shot circuits and thus through steering diodes 402 to the input 280. The collector of transistor 400 is connected through a resistor 404 and the decoupling filter comprised of choke 406 and capacitor 408 to the positive voltage supply terminal 410. The base of transistor 400 is biased by the network comprised of resistors 412–415. The resistors 413 and 414 in conjunction with the capacitor 416 also form an integrator for an input pulse applied to terminal 418. Thus, by making the terminal 418 positive, transistor 400 will be turned on, thereby connecting the base of transistor 288 to ground and disabling all of the one shot circuits 56. This procedure may be employed, for example, to disable the circuit and prevent a false digital output when the explosive charge is fired from the instrument boat.

The emitter of output transistor 310 of each of the six one shot circuits 56 is also connected through a diode 420 and output 62 to a single output isolation circuit 421 identical to the output isolation circuit 60. Thus, base current applied through any one of the diodes 420 will turn transistor 422 on and start the mutlivibrator 424 free running at about 10 kc. The multivibrator 424 drives a transistor 426 which switches current through the primary winding 428 of an isolation transformer 430. The voltage induced in the secondary winding 432 is rectified and filtered, then selectively attenuated by the variable resistor 434 before being connected to drive a recording galvo by leads 436. Similarly, the signal induced in the secondary winding 438 is rectified and filtered to provide a pulse across the output 440 which may be used for any desired purpose.

*Operation*

In a typical marine seismographic operation, both the instrument boat 10, trailing a streamer 12 with twenty-four groups of sensors, and the shot boat 16 are used. Each of the six water break amplifier channels 20 is connected to the output of a selected group of sensors. Assume that both the seismic and water break data are to be recorded by a digital system, and that both the analog envelope and digital pulses of the water break are to be recorded for monitoring purposes. Prior to the detonation of the shot, the recording systems are set in operation. Prior to the arrival of energy at the sensors, the output from the envelope detector and galvo driver 44 has zero output because of the forward voltage drop through the diodes 135–138, except when noise pulses exceed that voltage level, and this noise can be tuned out by adjusting the galvo db control 45. Under no signal conditions, transistors 166 and 168 of the AGC detector circuit 42 are turned off so that the maximum charge of +15v. is applied to capacitor 178 and is applied to reverse bias the field effect transistor 102, thus holding the field effect transistor 102 in the feedback circuit of amplifier 32 at the maximum impedance condition. This sets the gain of amplifier 30 at the maximum level determined by the fixed gain setting of switches 96–100. In the absence of an output from amplifier 32, transistor 204 in the threshold circuit 46 is turned off, capacitor 208 is discharged and transistor 210 is turned on, thus turning transistor 246 off and transistor 248 on. Output 280 of the variable threshold detector 46 is therefore at a low voltage level. As a result, transistor 288 at the input of the one shot 56 is turned off, as is transistor 318, and capacitor 302 is fully charged. As a result of the low potential across capacitor 208, transistors 262 of the fixed level signal detector 50 is turned off, and transistor 270 is turned on to provide a negative output from detector 50. The negative output turns transistor 328 of the one shot circuit 56 on. Transistor 306 is thus turned on and transistors 310, 318, 350 and 422 off. When transistor 350 is turned off, the free running multivibrator 360 is inoperative so that a zero potential is produced between outputs 388 and between outputs 390. Similarly, since transistor 422 is also turned off, multivibrator 424 is inoperative, and the potential between outputs 436 and between outputs 440 is also zero. It will be assumed that since separate shot boats are being used, transistor 400 is turned off so that the one shot 56 is not initially disabled by current through the diodes 402. If desired, however, the one shot 56 may be disabled until after the shot is fired to prevent overloading the circuits and the false generation of pulses.

Figure 8:
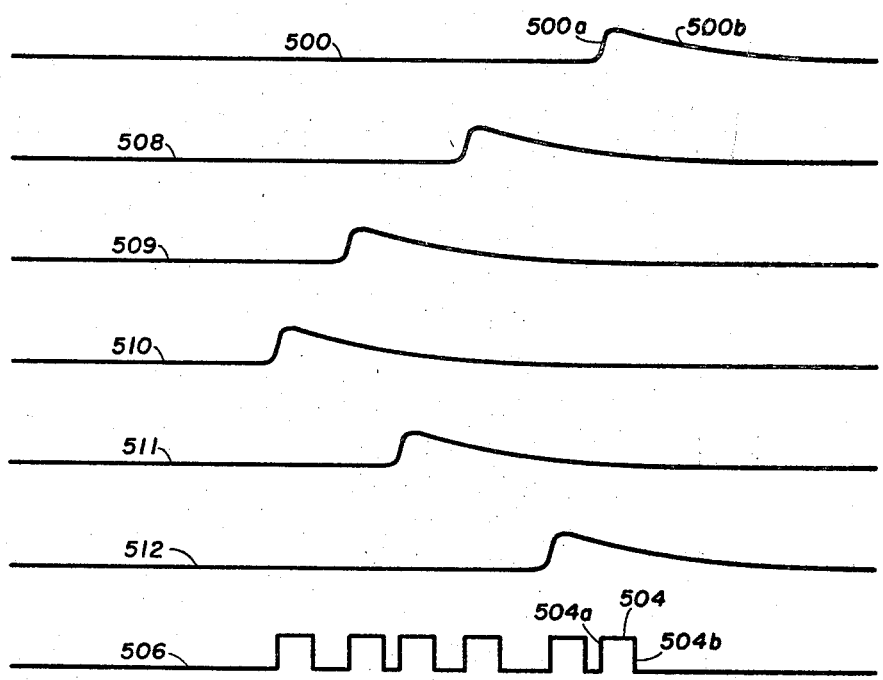
FIGURE 8 is a schematic representation of the record sheet used to monitor operation of the system of this invention.

Upon the first arrival of energy within the pass band of the input filter 24, the energy passed through the filter is initially amplified by amplifiers 30 and 32, which operate at the selected maximum gain, and the amplified signal applied to the primary winding 132 of the isolation transformer 40. The initial energy input is then rectified by the full wave rectifier formed by diodes 135–138, partially integrated by capacitor 140, attenuated as desired by the variable resistor 45, and applied to a recording galvanometer where it is recorded as a single analog trace 500, such as illustrated in FIGURE 8.

The amplified signal from amplifier 32 is also taken directly from the secondary winding 160 and applied to turn transistors 166 and 168 on and discharge the capacitor 178 through resistor 182 and transistor 168. The transistors 166 and 168 function as a half wave rectifier having a high transconductance. As capacitor 178 discharges, the potential applied to the gate of field effect transistor 102 is decreased, and the impedance of the transistor thereby decreased. This reduces the gain of amplifier 30 in accordance with the exponential discharge of capacitor 178. As a result of the initial high gain of the amplifiers 30 and 32 and the high initial amplitude of the water break energy, the galvanometer trace 500 has an abrupt rise point 500a signifying the arrival of the water break energy, followed by an exponentially decreasing slope 500b as the gain of the amplifier is decreased.

The initial amplified signal induced in the secondary windings 160–162 is full wave rectified and applied to the base of transistor 204, thus turning transistor 204 on to charge capacitor 208 through diode 206. When capacitor 208 is charged to a predetermined level, transistor 262 is turned on, which turns transistors 270 and 328 off, thereby enabling the one shot 56. Also, when the voltage at the base of transistor 210 reaches a sufficiently high level to raise the potential of control point 240 above ground potential, transistor 246 is turned on, thus turning transistor 248 off. This increases the potential of output 280 and turns transistor 288 on. A negative pulse is then coupled through capacitor 302 and diode 304 to turn transistor 306 off. This turns emitter-follower transistor 310 on, which in turn drives transistor 318 on to latch one side of capacitor 302 to ground. Transistors 350 and 422 are also turned on, thus setting the free running multivibrators 360 and 424 in operation and thereby reproduce the rise in potential at the emitter of transistor 310 at each of the four pairs of outputs 388, 390, 436 and 440. The output 388 is typically connected to drive a digital recording system and may be recorded as a digital pulse on trace 502, the leading edge 502a constituting the arrival time of the water break energy. The output 436 is used to drive a galvanometer and thus produces an identical pulse 504 on a trace 506 having a leading transition 504a coincident with the transition 502a.

After capacitor 302 has been recharged through resistor 324, transistor 306 is again turned on, thus turning emitter-follower transistor 310 off, which turns transistors 318, 350 and 422 off, thus causing the trailing transitions 502b and 504b of pulses 502 and 504. The function of the fixed level signal detector 50 is to reduce the width of the pulses 502 and 504 in the event a spurious signal within the pass band of the input filter 24 has triggered the one shot circuit 56. Thus, if the output from amplifier 32, and therefore from the isolation transformer 40, terminates for reasons other than the normal decline of the automatic gain control, the voltage on capacitor 208 will decrease as a result of discharge through resistor 212, and transistor 262 will be turned off, thus turning transistors 270 and 328 on. When transistor 328 is turned on, capacitor 302 is very rapidly charged, being charged at approximately one-thirtieth the time required to charge the capacitor through resistor 324, so that transistor 306 is prematurely turned on, thus turning transistors 310, 350, 318 and 422 off to terminate operation of the multivibrators 360 and 424 and terminate the output digital pulses. In many instances, when a spurious pulse initiates operation of the one shot 56, the operation of the fixed level signal detector 50 will so reduce the width of the pulse that it will have no effect upon the digital recording system.

Figure 9:
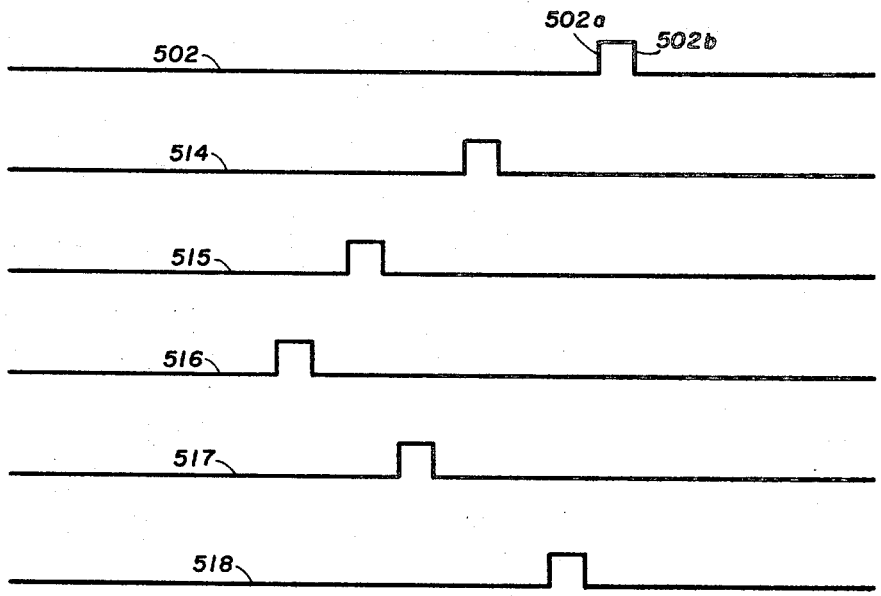
FIGURE 9 is a schematic representation of the digital water break pulse produced by the system of this invention.

Each of the other five amplifiers produces similar analog envelopes 508–512 which are customarily recorded upon the same record sheet as separate traces along with the composite pulse trace 506 which also includes the digital pulses from each of the channels. The pulses 514–518 in FIGURE 9 from outputs 388 of the other channels 20 are individually recorded by the digital field recording system. By recording the composite digital trace 506 on the same record sheet as analog traces 500 and 508–512, the coincidence between the analog envelopes and the digital pulses may be readily determined for monitor and adjustment purposes.

It will be noted that the circuit 20 has a number of adjustments which can be made to achieve optimum operation. The maximum or initial gain of the combination of amplifiers 30 and 32 can be selected by switches 96–100. The rate of recovery of the automatic gain control circuit can be adjusted by resistor 38. The amplitude of the analog envelope produced by the circuit 44 can be adjusted by the attenuation control 45.

In order to adjust the amplifier for operation, the adjustable gain control circuit 34 is initially set to provide a maximum gain, and the galvo control 45 set to provide minimum attenuation. The galvo traces 500 and 508–512 are then observed before shooting commences. If the traces are relatively quiet and no impulsive noise bursts are observed, the gain is left at the maximum adjustment. If some of the traces are noisy, the variable threshold detector 48 is probably being tripped, and this condition can be monitored on the trace 506. If any of the pulse circuits are tripping, the gain of the amplifier 30 in the channel in which tripping is observed is reduced until tripping ceases. After the first water break signals are received, the galvo control 45 is readjusted to provide the desired deflection at the galvo output. The width of the digital pulses and the coincidence of the leading edge of the pulses with the leading edge of the corresponding analog pulses may be adjusted by the threshold voltage ladder 52. If the leading edges of the pulses of the monitor trace 506 do not coincide with the leading edge of the analog pulses, the threshold voltage ladder is adjusted to reduce the threshold voltage until coincidence is obtained. On the other hand, if the pulses exceed the desired pulse length, usually about 30 milliseconds, then the threshold voltage ladder is adjusted to increase the threshold voltage to achieve the desired pulse width, or until the increased threshold causes loss of leading edge coincidence. The recovery time of the AGC circuit is preferably maintained at a maximum value except when exceedingly noisy conditions exist, in which case a rapid recovery may be desirable so that the true water break signal will not be obscured by a preceding noise spike.

In the particular embodiment herein described in detail, the rate of attack of the AGC circuit is selected by the value of resistor 182 such that the output signal from amplifier 32 decreases below a predetermined AGC value in about 30 milliseconds, a period shorter than the period during which energy within the pass band is detected at the seismic sensors. The fixed level detector 50 is set to produce an output when the AGC level is exceeded, and to terminate the output when the AGC level is attained. Thus, it will be noted that the one shot circuit 56 will be enabled for about 30 milliseconds under normal conditions. The threshold voltage of the variable threshold detector may be selected so that the circuit will trip at any voltage from slightly less than the AGC level to a voltage considerably greater than the AGC level which trips the fixed level detector 50. Higher threshold values are selected to provide greater noise discrimination, but if too high a value is selected, then coincidence problems may result. The one shot circuit 56 normally produces a pulse about 30 milliseconds in duration so that the output of both detectors 46 and 50 will have ceased during this period of time as a result of the AGC level being reached. The AGC level is maintained so long as an input signal is applied to the amplifiers so that no secondary pulses can be produced by the pulse circuits.

From the above detailed description, it will be noted that a unique and useful water break detection system has been described. By using the passive band-pass filter, the seismic sensors or transducers are not overloaded in the seismic frequency range because of the exceedingly high input impedance of the passive filter in the seismic energy range. At the same time, the low input impedance in the pass band range efficiently transmits signals over a wide amplitude range, typically a range extending from microvolts to volts. The passive input filter does not induce appreciable noise at the input. This compares with the use of active filters which are not suitable for microvolt levels due to their inherent noise generation, or the use of a preamplifier gain stage before filtering which is objectionable because it would be subject to overload conditions for large signal arrivals. If signal limiting occurs before filtering, this renders the filter useless because new frequency components not contained in the original signal are generated.

Thus, it will be noted that amplifier 30 is a variable gain, negative feedback amplifier. The feedback path is variable by two separate circuits, the first being the manually adjustable gain control circuit 34, and the second being the automatic gain control circuit 36. In the particular embodiment illustrated, the passive gain control may be operator adjusted in 6-db steps to yield from 54-db to 90-db combined gain for amplifiers 30 and 32 as required by differing signal conditions. The AGC circuit 36 is capable of reducing the overall gain to nearly 10 db and therefore has nearly and 80-db range. The AGC detector 42 is purposely designed with a slow attack rate so that after the first few milliseconds of energy have passed at the maximum gain selected by the setting of the adjustable gain control 34, the gain becomes squelched as low as required to prevent further output. Resistor 38 is adjusted so that the AGC receovery time may be up to one-half second, unless operating conditions require a fast recovery in order to reduce the likelihood that a noise spike will initiate operation of the AGC circuit, thus squelching the true water break. This is particularly a problem where the explosive charge is fired from the instrument boat because the firing circuit momentarily overloads all of the instrumentation on the instrument boat.

Although a preferred embodiment of the invention has been described in detail, it is to be understood that various changes, substitutions and alterations can be made in the components and combinations thereof without departing from the spirit and scope of the invention as defined by the appended claims.

What is claimed is:

1. In a system for detecting the first arrival of waterborne sonic energy within a characteristic frequency band at each of several seismic sensors, the combination of:
    a plurality of band-pass filter means individually connected to the output of one of the several seismic sensing means for passing electrical energy produced by the sensing means within said characteristic frequency band,
    a plurality of amplifier means the input of each of which is connected to the output of one of said band-pass filter means, the amplifier means each having a controllable high gain,
    a plurality of detector means each responsive to the occurrence of a signal of a predetermined character at the output of one of said amplifier means for progressively decreasing the gain of the amplifier to a low value in accordance with a predetermined program after the occurrence of the signal of predetermined character in a manner such that sonic energy within the characteristic frequency band will be initially amplified to produce an amplified signal representative of the first arrival, and the amplified signal will then be attenuated to prevent further indication of the presence of waterborne sonic energy at the seismic sensing means,
    a plurality of pulse circuit means individually connected to the output of one said amplifier means to produce a digitalized pulse when the output of the connected amplifier means exceeds a predetermined threshold value and for terminating the pulse after a predetermined period, said predetermined period being longer than the period required for the output of the connected amplifier means to return to a level less than the threshold voltage level as a result of the operation of said detector means, and
    means connected to the output of each of said plurality of pulse circuit means for producing one signal including each of the output pulses.

2. In a system for detecting the first arrival at a seismic sensor of waterborne sonic energy within a characteristic frequency band, the combination of:
    band-pass filter means for connection to the output of the seismic sensing means adapted to pass electrical energy produced by the sensing means within said characteristic frequency band,
    first amplifier means the input of which is connected to the output of the band-pass filter means,
    second amplifier means the input of which is connected to the output of the first amplifier means,
    isolation transformer means the primary winding of which is connected to the output of the second amplifier means,
    feedback circuit means interconnecting the output and the input of the first amplifier means including voltage controllable impedance means for decreasing the impedance of the feedback circuit in response to an increase in voltage applied thereto,
    detector means connected to a secondary winding of the isolation transformer means for applying a high voltage to the voltage controllable impedance means under a no-output signal condition at said second amplifier and for applying a progressively decreasing voltage varying in accordance with a predetermined program to said controllable impedance in response to an output signal from the second amplifier of a predetermined character whereby the gain of the first amplifier will be progressively decreased in accordance with a predetermined program,
    rectifier means connected to a secondary winding of the isolation transformer means for producing a D.C. voltage level representative of the A.C. output signal of the second amplifier means,
    first threshold detector means for producing an output signal when the voltage produced by the rectifier means exceeds a predetermined threshold level,
    one shot circuit means connected to the output of the first threshold detector means for producing a pulse of predetermined width in response to the output signal from the first threshold detector means,
    voltage controllable free running multivibrator means connected to the output of the one shot circuit means and set in operation by the output pulse from the one shot circuit means,
    output transformer means,
    switching circuit means connected to control current through the primary winding of the output transformer means switched by the output from the free running multivibrator, and
    rectifier means connected to the secondary winding of the output transformer means for producing a D.C. voltage level from the A.C. signal induced in the secondary winding.

(References on following page)

References Cited

UNITED STATES PATENTS

| | | | |
|---|---|---|---|
| 2,346,369 | 4/1944 | Eisler | 340—15.5 |
| 2,905,772 | 9/1959 | Bardeen | 340—15.5 X |
| 2,986,707 | 5/1961 | Blecher | 330—86 |
| 3,087,120 | 4/1963 | Schoellhorn et al. | 330—86 X |
| 3,098,199 | 7/1963 | Carney et al. | 330—29 |
| 3,178,698 | 4/1965 | Graham | 330—86 X |
| 3,210,679 | 10/1965 | Rhodes | 330—29 X |
| 3,254,308 | 5/1966 | McLean et al. | 330—29 X |
| 3,292,013 | 12/1966 | Golahny. | |
| 3,277,438 | 10/1966 | Ford et al. | 340—15.5 |
| 3,308,392 | 3/1967 | McCarter | 340—15.5 |

RODNEY D. BENNETT, *Primary Examiner.*

D. C. KAUFMAN, *Assistant Examiner.*